United States Patent
Giroux et al.

(10) Patent No.: US 7,877,516 B2
(45) Date of Patent: Jan. 25, 2011

(54) DATA MANAGEMENT SYSTEM AND METHOD

(76) Inventors: Philippe Giroux, 308-100 Boteler Street, Ottawa, Ontario (CA) K1N 8Y1; Sandy Walsh, 9E, P.O. Box 49, Waverly, Nova Scotia (CA) B0N 2F0

( * ) Notice: Subject to any disclaimer, the term of this patent is extended or adjusted under 35 U.S.C. 154(b) by 1025 days.

(21) Appl. No.: 11/468,878

(22) Filed: Aug. 31, 2006

(65) Prior Publication Data

US 2007/0067448 A1    Mar. 22, 2007

Related U.S. Application Data

(63) Continuation of application No. 10/880,459, filed on Jul. 1, 2004, which is a continuation of application No. 09/620,576, filed on Jul. 20, 2000, now Pat. No. 6,782,003.

(60) Provisional application No. 60/205,246, filed on May 19, 2000.

(51) Int. Cl.
*G06F 15/16* (2006.01)
(52) U.S. Cl. .................. 709/246; 709/248; 709/224; 709/206
(58) Field of Classification Search .......... 709/206, 709/246
See application file for complete search history.

(56) References Cited

U.S. PATENT DOCUMENTS

| | | | |
|---|---|---|---|
| 5,608,874 A * | 3/1997 | Ogawa et al. ........... 709/246 |
| 5,754,306 A * | 5/1998 | Taylor et al. ........... 358/400 |
| 6,034,689 A | 3/2000 | White et al. |
| 6,040,832 A | 3/2000 | Poreh et al. |
| 6,199,077 B1 | 3/2001 | Inala et al. |
| 6,269,405 B1 * | 7/2001 | Dutcher et al. ........... 709/248 |
| 6,389,455 B1 | 5/2002 | Fuisz |
| 6,405,243 B1 | 6/2002 | Nielsen |
| 6,473,781 B1 | 10/2002 | Skagerwall et al. |
| 6,487,278 B1 * | 11/2002 | Skladman et al. ........ 379/88.13 |
| 6,560,620 B1 * | 5/2003 | Ching ........................ 715/229 |
| 6,963,908 B1 | 11/2005 | Lynch et al. |
| 2001/0034843 A1 | 10/2001 | Hess |
| 2002/0073043 A1 | 6/2002 | Herman et al. |
| 2002/0078079 A1 | 6/2002 | Rangan et al. |
| 2002/0194177 A1 | 12/2002 | Sherman et al. |
| 2003/0046353 A1 | 3/2003 | Chung et al. |
| 2008/0147883 A1 | 6/2008 | Philyaw |

OTHER PUBLICATIONS

Screen Shots from Yodlee website (http://www.yodlee.com/corporate_index.html), downloaded on Jul. 14, 2000 (18 pages).

Screen Shots from FusionOne website (http://wwvv.fusion1.com/index.html), downloaded on Jul. 14, 2000 (24 pages).

Wong, "FusionOne Launches New Internet Synchronizing Service," SF Gate, May 18, 2000 (3 pages).

(Continued)

*Primary Examiner*—Kyung-Hye Shin

(57) ABSTRACT

A method of replicating data on a source to a destination comprising the steps of: extracting data from a source via a user interface in a source format; converting the extracted data from the source's format into a destination format; and uploading the converted data to said destination.

24 Claims, 6 Drawing Sheets

OTHER PUBLICATIONS

Forman et al., "Time to Sync or Swim," article, May 18, 2000 (3 pages).
Magid, "Many Providers Offer Tools for Performing PC Tasks on the Net," article, latimes.com, Jul. 10, 2000 (3 pages).
US Office Action on U.S. Appl. No. 10/880,459, dated Mar. 24, 2009.
Office Action from Canadian Patent No. 2,314,056 mailed Apr. 14, 2008.
Office Action for U.S. Appl. No. 10/880,459, mailed Oct. 15, 2009.
Notice of Allowance on U.S. Appl. No. 10/880,459, mailed Apr. 2, 2010

* cited by examiner

Welcome to ServiceSwitch in association with Hotmail

You have requested a transfer of your Email service from your old service provider to our service. If you wish to proceed, please enter the following data, then select OK. Note that the Email function from your old service provider will continue to operate normally and you will still be able to read and create messages. There is no chance of losing information. As the transfer of data progresses you will be informed regularly, and can abort the process at that time. At the end of the process you will be asked to access your new email service and check that all of the data is as expected. All of your contact lists and address lists will also be transferred.

Old email service URL: [ ]
e.g. www.coolmail.com

Old Email login ID: [ ]

Old Email Password: [ ]

[ OK ]   [ Cancel ]

Figure 5

DATA MANAGEMENT SYSTEM AND METHOD

CROSS-REFERENCE TO RELATED APPLICATIONS

This application is a continuation of U.S. application Ser. No. 10/880,459, filed Jul. 1, 2004, and entitled "DATA MANAGEMENT SYSTEM AND METHOD," which in turn is a continuation of U.S. application Ser. No. 09/620,576, filed Jul. 20, 2000, and entitled "DATA MANAGEMENT SYSTEM AND METHOD," now U.S. Pat. No. 6,782,003, which in turn claims the benefit of U.S. Provisional Patent Application No. 60/205,246, filed On May 19, 2000.

The present invention relates generally to computers and communications, and more specifically, to a method and system for moving personal information over computer networks.

BACKGROUND OF THE INVENTION

It is well known that data communication networks such as the Internet, Wide Area Networks (WANs) and Local Area Networks (LANs), offer efficient and ubiquitous means of organizing and distributing computerized data. These attributes have resulted in their widespread use for both business and personal applications. For example, the Internet is now a common medium for operating online auctions, academic and public forums, distributing publications such as newspapers and magazines, and performing electronic commerce and electronic mail transactions.

New services are being provided over the Internet which are personalized or customized to users' requirements, which has resulted in personal data being stored in the service provider's domain. However, there are no effective ways for the user to easily relocate this personal data from one service provider to another; personal data residing with the old service provider must be manually re-entered with the new service provider.

FIG. 1 presents an exemplary system for a typical networked application or service, such as electronic mail (E-mail). The interconnection of various hosts and other devices is shown over an Internet 100. The Internet 100 consists of a vast interconnection of computers, servers, routers, computer networks and public telecommunication networks which allows two parties to communicate via whatever entities happen to be interconnected at any particular time. Presently, the systems that make up the Internet 100 comprise many different varieties of computer hardware and software. In general, this variety is not a great hindrance as the Internet 100 is unified by a small number of standard transport protocols.

Access to this Internet 100 is provided by Internet Service Providers (ISP) 130 who convert the various communication protocols used by end-user computers 140, 150 to the standard Internet protocols. For example, end users 140, 150 may be connected to an ISP 130 using wireless communications, or hardwired connections such as cable modems, television set-top boxes, or telephone line modems, using various technologies such as ADSL (asynchronous digital subscriber line), ISDN (integrated services digital network), or other known media and technologies.

Additionally, a number of Application Service Providers (ASP) 110, 120 are typically connected to the Internet 100. These ASPs 110, 120 are third-parties which provide software and other computer-based services to users across a wide area network from a remote location. Generally, these services are provided for a fee (usually monthly or yearly), though the ASPs 110, 120 may offer basic services for no cost and generate revenues in a peripheral manner, such as through advertising or sale of advanced services. The services offered by the ASPs 110, 120 might include:

commercial or personal banking;
investment services such as stock portfolio tracking;
calendar/appointment books;
contact lists, address books;
mailing lists;
sports/news/entertainment/weather forecast preferences;
document storage, file backup services, distributed or shared files provider;
collaboration tools such as message boards;
sales automation applications;
folders;
project files;
enterprise resource planning (ERP) software;
entertainment services, such as networked games; and
office applications.

Generally, a service such as Email may be provided by a number of competing ASPs 110, 120. Many of these ASPs 110, 120 provide their service using a standard protocol, HTML (hypertext markup language), which allows access in a ubiquitous fashion from any computer having an appropriate 'browser' connected to the Internet. HTML is one of the standard languages of the Internet 100 for defining the structure and format of a web page.

When an end-user wishes to access their Email, they do so by 'connecting' to their Email provider, for example, ASP 110 and logging on by entering a userID and Password in response to a challenge from the ASP 110. Standard HTML or equivalent protocols allow the end-user to read, create, send, and store Emails as well as create, read and store related information such as address lists, on the Email provider's 110 website.

FIG. 1 is something of a simplification, as ISPs 130 and ASPs 110, 120 are often connected to the Internet 100 through Network Access Points (NAPs), rather than directly as shown in FIG. 1. As well, the Internet 100 itself is far more complex than that shown in FIG. 1, including for example, leased and private communication lines and subnetworks, firewalls and routers. However, these details would be well known to one skilled in the art.

Presently, the only way to relocate personal data from one service provider to another is to do so manually. In the case of Email, for example, relocating from ASP 110 to ASP 120 would require one to:

1. create a new Email account on ASP 120;
2. recreate the address book or contacts list, which might involve accessing both accounts and manually 'cutting and pasting' individual entries from one service provider to the other. In the best case, an intermediate file would be created by the user by 'exporting' data from the old Email ASP server 110 and 'importing' that same data into the new Email ASP server 120, possibly requiring some experimentation or conversion to rationalise the two formats;
3. retain access to old Email, both sent and received;
4. replicate the folder structure used to store Emails, which involves inspecting the existing structure and manually creating the same, or similar folder structure on the new Email ASP server 120;
5. individually transfer each Email message from the old Email ASP server 110 by copying it to their computer, and possibly manipulating its format, then copying it from there to the new Email ASP server 120;

6. periodically checking the old Email ASP account to collect Email sent to the old address, with the consequent need to regularly check two accounts, and the possibility of forgetting to access the old Email account regularly, and missing important messages until they are too old;
7. inform all Email contacts of the new address; and
8. arrange for the old Email provider to forward any new Email to the new account.

Thus, when an end-user wishes to change from one Email provider to another, the transfer or copying of the data stored on the first (old) ASP's server to the second (new) ASP's server is a major investment in time for the end-user, and is an error-prone process. Omission of a single file could be critical, and at the least annoying. Further, if the Emails had been stored in some form of hierarchy using 'folders', then this folder structure must also be recreated, and the files sent to the appropriate folder. As a consequence, misfiling is another potential hazard.

Because of the physical difficulty and practical hazards of relocating personal data from one ASP 110, 120 to another, end-users have been reluctant to do so; a condition known in the industry as 'stickiness', since users are forced to 'stick' with one service. This "stickiness" presents a tremendous barrier to the entry of new ASPs and to open competition between existing providers. To capture costumers from their competition, a new provider must offer enough of an incentive in terms of price, features, or quality to convince customers to accept the difficulties of relocating ASPs.

If the above problems could be overcome, end-users could easily transfer their personal data from one Application Service Provider to another, reducing the barriers to new competition, and permitting the end-user to exercise real choice.

There is therefore a need for a means of replicating the personalized environment from one service provider to another, over the Internet and similar networks, provided with consideration for the problems outlined above.

SUMMARY OF THE INVENTION

It is therefore an object of the invention to provide a method and system which obviates or mitigates at least one of the disadvantages described above.

One aspect of the invention is broadly defined as a method of relocating data from a source to a destination comprising the steps of: extracting data from a source via a user interface in the source's format; converting the extracted data from the source's format into a destination format; and uploading the converted data to the destination.

BRIEF DESCRIPTION OF THE DRAWINGS

These and other features of the invention will become more apparent from the following description in which reference is made to the appended drawings in which:

FIG. 5 illustrates a user screen following a request to initiate transfer of service.

DESCRIPTION OF THE INVENTION

Figure 2:
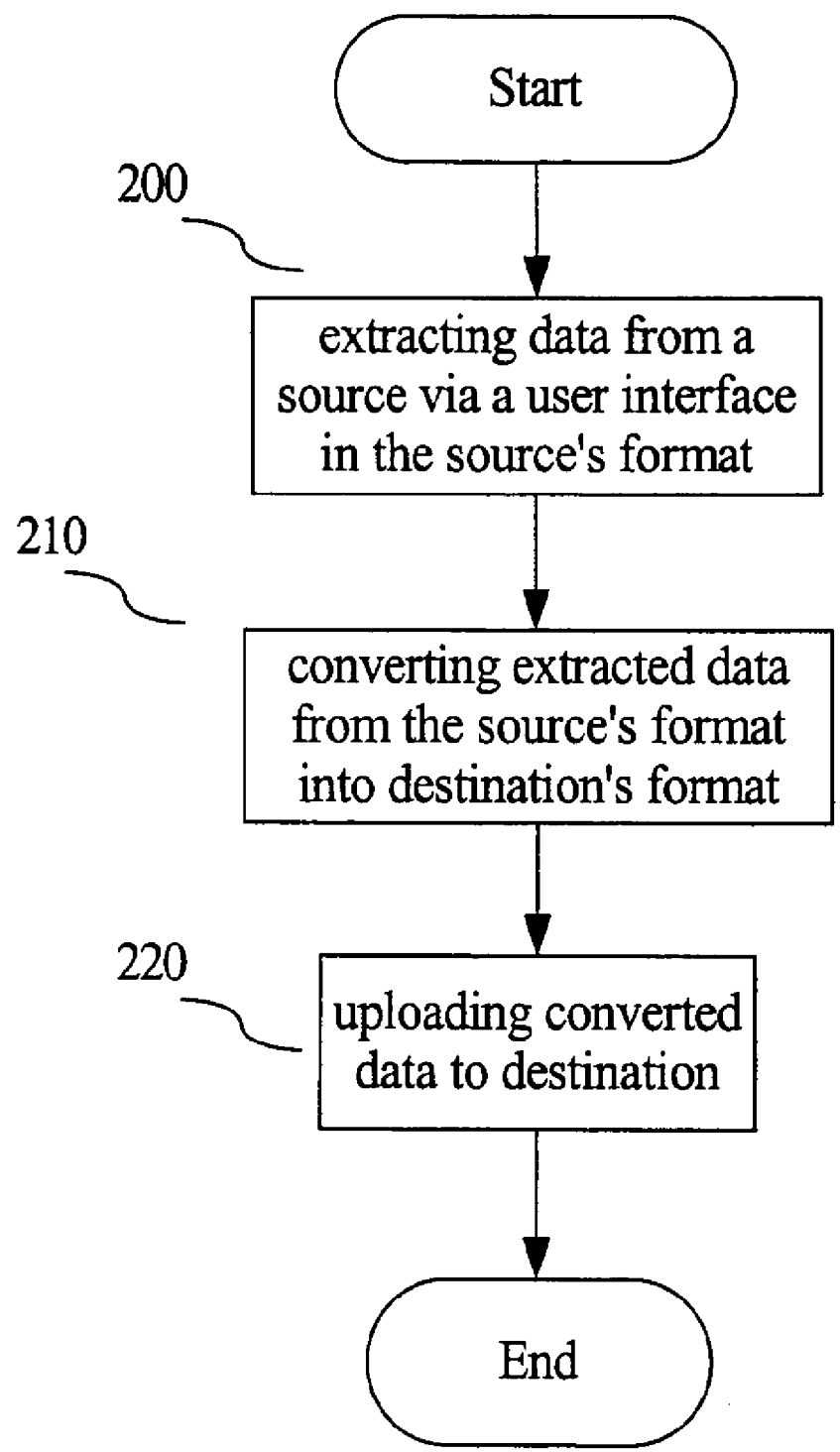
FIG. 2 is a flow chart of a method of transferring personalised or customised data in a broad embodiment of the invention.

A methodology which addresses the objects outlined above, is presented as a flow chart in FIG. 2. This method of replicating data on a source to a destination is effected by extracting data from the source via a user interface in the source's format at step 200, then converting this extracted data from the source's format into destination's format at step 210. Finally, the converted data is uploaded onto the destination at step 220.

In its application to current technology, the data source and destination may be web sites residing on Internet servers which provide application services to end users, but may also be personal components such as personal computers (PCs), personal digital assistants (PDAs) or cellular telephones. The invention may also be applied to other communication networks including wireless networks such as cellular telephone networks, and hardwired networks such as the public switched telephone network, cable television networks, ATM networks, frame relay networks, local area networks (LANs) and wide area networks (WANs), Intranets and Extranets, with their associated protocols, components and technologies, or combinations of such networks.

Typically, the data source will have a user interface which is either text-based or graphic-based, such as a graphic user interface (GUI), which allows the end user to interact with the application service being provided. The invention accesses the user's personal or customized data and preferences on the data source via this user interface, generally emulating the user himself. This allows the invention to access any information that the end user himself can access, so this information can be extracted and eventually copied to the data destination. Since the access is via the user interface, the ASP being targeted cannot selectively allow the end user to view his personal data, while preventing the downloading of the same personal data.

When the data is extracted from the source, it will generally contain formatting and other codes, as well as the personal data that the end user wishes to relocate. Hence, it may be necessary to convert this data into the form required by the target, possibly removing graphic objects and links, formatting codes, re-arranging data fields, and altering field sizes. Such operations would be clear to one skilled in the art from the teachings herein, but greater explanation of this process is provider hereinafter.

Similar to the step of extracting, the step of uploading the converted data to the destination at step 54 may be effected over various networks and using various protocols such as LANs, WANs, Intranets, cellular, telephone and cable networks, with their associated protocols and technologies. This data may be up loaded to the destination site in a number of manners, including via a user interface or an import utility. If the uploading is done via a user interface, the invention will request entry pages, load them with data and return them using standard Internet protocols and formats.

Figure 1:
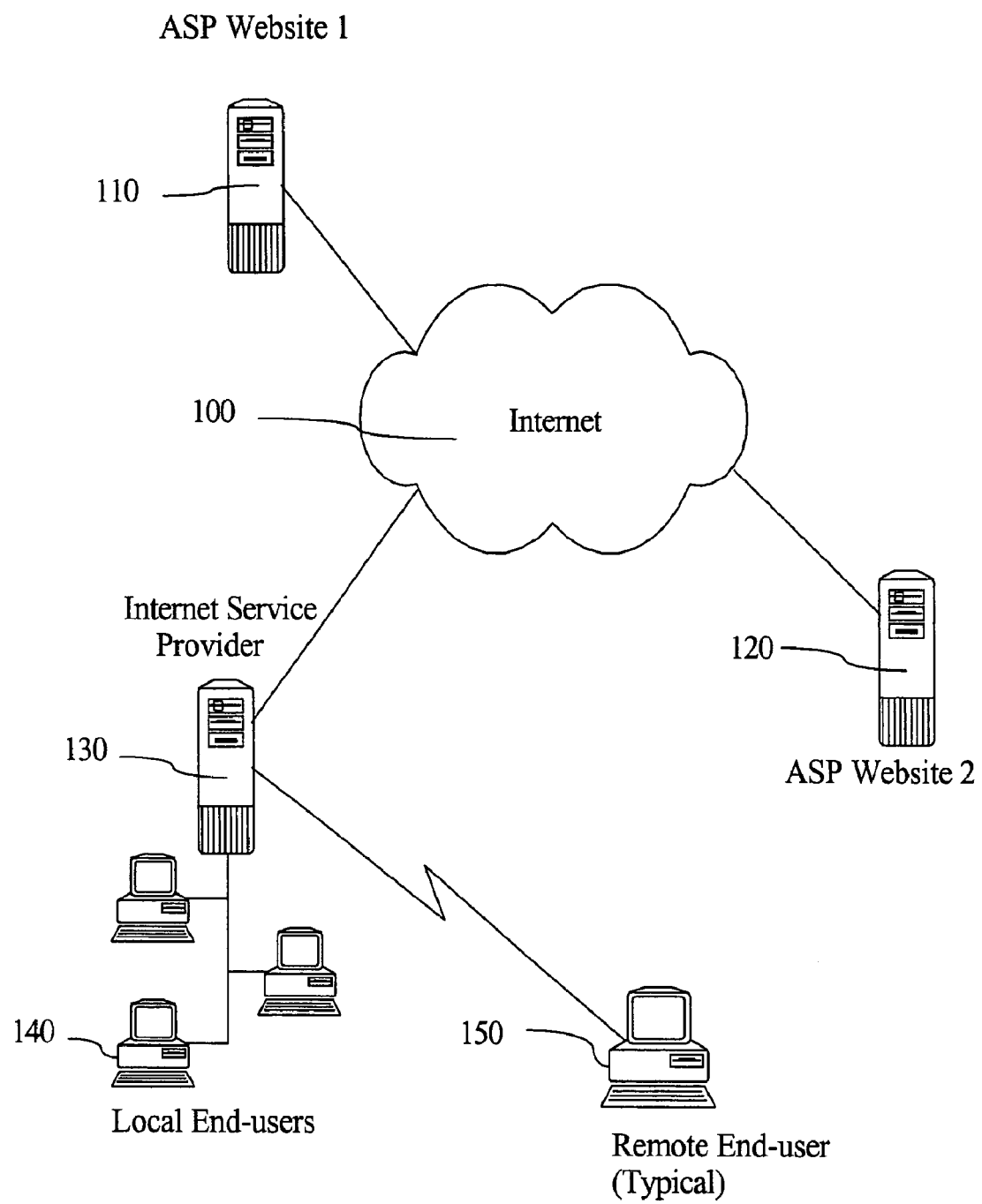
FIG. 1 is a physical layout of an exemplary communication network as known in the prior art.
Figure 3:
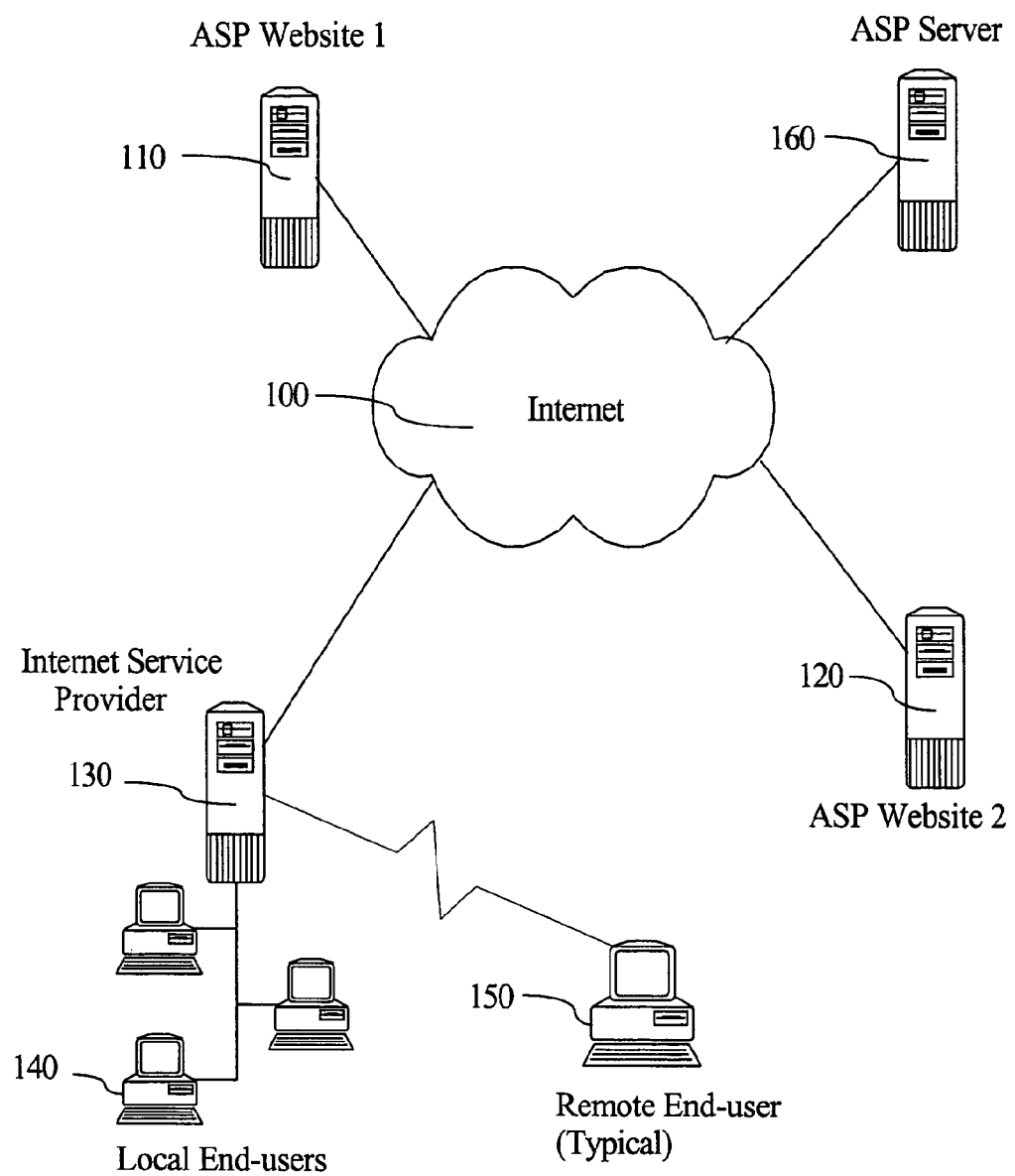
FIG. 3 is a physical layout of an exemplary communication network in a broad embodiment of the invention.

FIG. 3 presents an exemplary system for implementing the invention. This system is generally the same as the system presented in FIG. 1, except that an additional server 160 has been included to support the ASP of the invention. The ASP server 160 may communicate with the other entities in the system using standard communication media and protocols. Of course, the application of the invention to other communication systems such as such as LANs, WANs and cellular telephone networks, would require a different device to support the software, which would be understood by one skilled in the art.

The software of the invention may be stored on the ASP server 160 where it may execute, or be sent to other locations for execution. The software may also be implemented as a software agent which executes in a mobile or distributed manner, or alternatively as an executable file or applet which is downloaded to a subscribing ASP and executes on their server. The actual location of such software is only limited by the ability of that location to provide the functions of:

- understanding the request for information in the form of a recognisable address of a relevant server containing the desired data, such as a Uniform Resource Locator (URL) or equivalent, and
- providing a two-way path and appropriate protocol for the transfer of data between the software and the service providers, such as HTML over the Internet.

These functions may be called using an appropriate Applications Programming Interface (API).

In the preferred embodiment described hereinafter, the software has a modular architecture and executes on the ASP server 160, though an initiation window resides on the "partner" ASPs 110, 120, allowing them to solicit new customers themselves.

The invention of FIGS. 2 and 3 address the problems in the art. It allows fast, effective transfer of all relevant personalized or customised data to take place with little likelihood of loss or misfiling of the data. This ability permits service transfers to be carried out reliably, which in turn translates into greater end-user acceptance of Email, and improved opportunities for the ASPs to market their services and capture an increasing share of the available end-users.

Figure 4A:
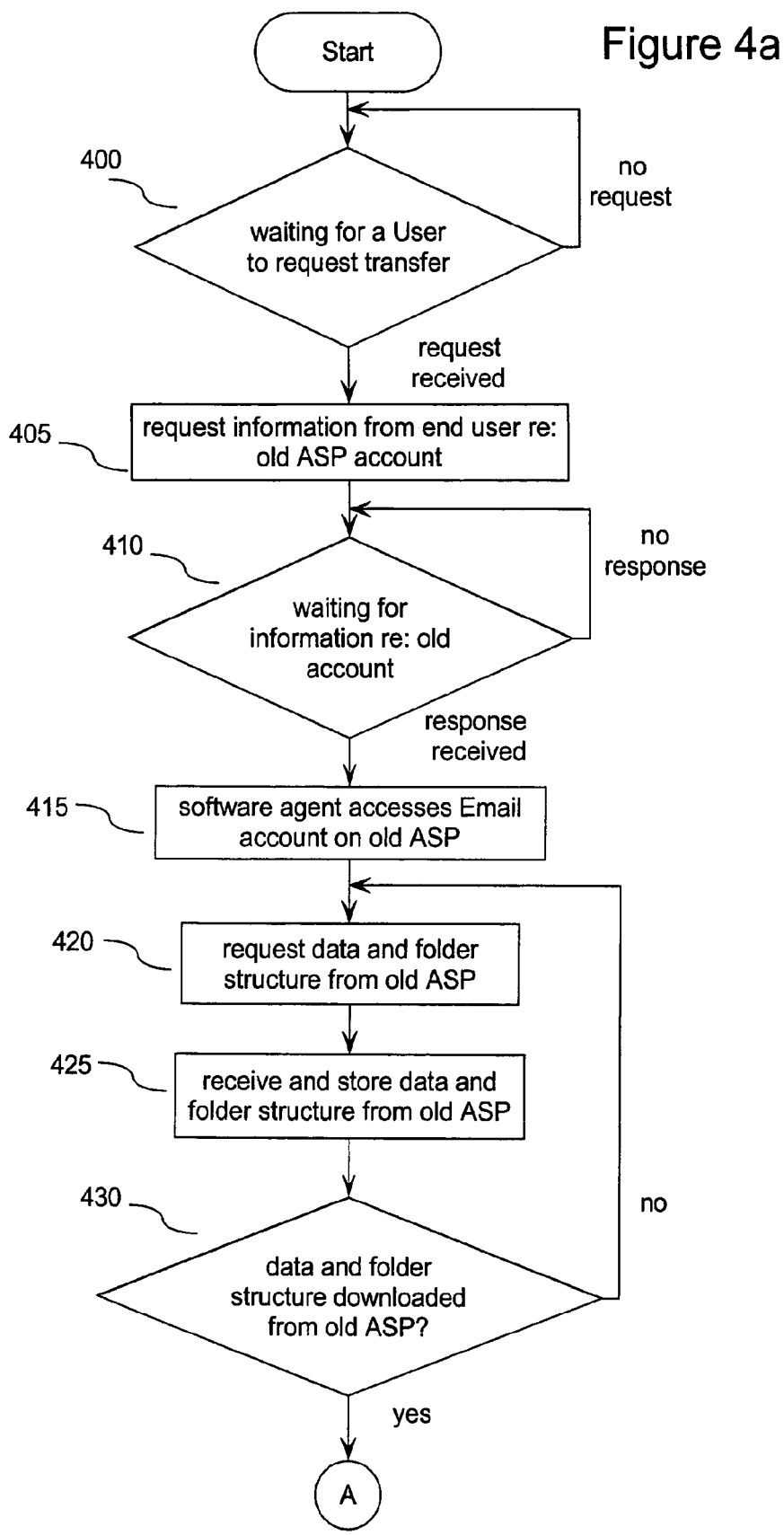
FIGS. 4a and 4b are a flow chart of a method of transferring personalised or customised data in a preferred embodiment of the invention.
Figure 4B:
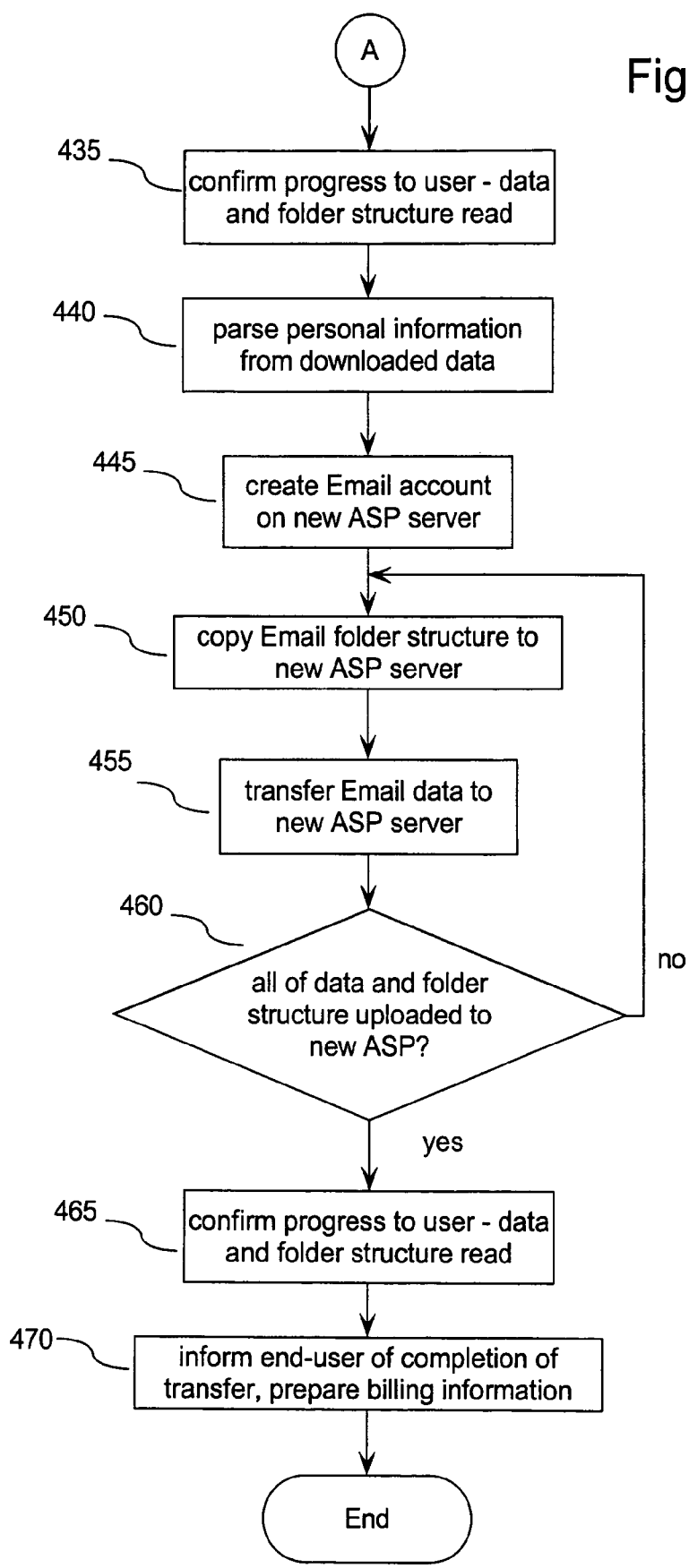

FIGS. 4a and 4b present a flow chart of the preferred method of the invention, as applied to the example of transferring an email account from one ASP to another.

At step 400, the routine sits in a loop awaiting a request from a user to transfer their personal data from one service provider to another. As described above, the invention software will preferably reside on an ASP server 160 itself, and be initiated when a user clicks on a "transfer" icon on a partnering site. When the user clicks on such an icon, a message will be sent to the ASP server 160 to initiate this routine. The end-user may send his request via his ISP using a number of different devices including a computer, smart terminal, personal digital assistant, Internet-ready telephone or other similar interface. Such devices and their supporting networks and protocols are well known in the art. Clearly, the algorithm may also be initiated in other manners which would be clear to one skilled in the art.

To elaborate on the Internet example, a Web browser is an application program that runs on the end user's computer and provides a way to look at and interact with all the information on the World Wide Web. A Web browser uses the Hypertext Transfer Protocol (HTTP) to make requests of Web servers throughout the Internet on behalf of the Web browser user. Currently, most Web browsers are implemented as graphical user interfaces.

When the end-user enters file requests by either "opening" a Web file, typing in a URL, or clicking on a hypertext link, the Web browser builds an HTTP request and sends it to the Internet Protocol address indicated by the URL. The HTTP software in the destination server machine receives the request and, after any necessary processing, the requested file is returned.

The HTTP is the set of rules for exchanging files on the World Wide Web, including text, graphic images, sound, video, and other multimedia files. HTTP also allows files to contain references to other files whose selection will elicit additional transfer requests (hypertext links). Typically, the HTTP software on a Web server machine is designed to wait for HTTP requests and handle them when they arrive.

At step 405, the routine then returns an HTTP form requesting information from end user that will allow to access the old ASP account. Typically, this information will consist of the URL of the old ASP, and the end user's corresponding account identification and password. This request may be forwarded to the end user by email or similar means, but is preferably sent in the form of a web page 500 as per FIG. 5. Of course, other relevant information may also be request, as appropriate to the situation. The routine then sits in the loop of step 410, while awaiting the response from the end user.

When the end user has filled the information on this web page and returned it to the ASP server 160 by clicking on the "return" button, the routine accesses the end user's account on the old ASP at step 415. This is doing by requesting the URL page and responding to the challenge for the end user's account information, as the end user would do himself in a standard logon.

Of course, one may add a time-out routine to the waiting loop of step 410, provide feedback to the user if there is a failure to properly access the old ASP at step 415, or advise the user if the information provided in response to the request of step 410 is incorrect. The addition of such steps to the algorithm would be clear to one skilled in the art, and are peripheral to those of the invention itself.

Once the old account has been accessed, the routine may begin to send requests for data and folder structure information from the old ASP at step 420. These requests will be prepared to mimic the interaction of the end user to the particular web site from which data is being extracted.

The routine receives the requested data and folder structure at step 425 and stores this information until it has been determined at step 430 that all of the data and folder structure have been downloaded. Preferably, the routine will then advise the end user as to the progress that has been made at step 435, specifically that the data and folder structure have now been successfully downloaded from the old ASP.

As noted above, the received data may arrive in web pages which could include text, graphics, audio files, executable applets, data files or attachments such as software files, or other data and files known in the art. Therefore, at step 440, personal information is then parsed from the downloaded data. The format and structure of the data is derived from combinations of context and knowledge of the layout of the data as it is presented by the old Email ASP server. The layout of the data might be compared with known templates for known Email ASPs to simplify and improve the speed and accuracy of the interpretation of the data.

This parsing may be done in a number of ways, the principles of which are generally known in the art, though the application is not known, for example:

1. deriving the relevant source data by use of a 'delta' technique which compares a received web page to an empty or null web page;
2. recognising the various types of data by 'positional information', tags or sequence;
3. comparing a data file to a data template for the web page to extract non-template data. If a particular web site is used a great deal, it may be more reliable to create a special template tailored to remove the formatting code from its corresponding web pages; or
4. extracting the formatting codes from a markup language data file (such as HTML or XML) to obtain the raw data.

Now that the personal data and organizational structure have been culled from the old ASP, the issue of uploading this data to the new ASP may be addressed.

The task of uploading data begins at step 445 where a new email account on the new ASP server is created. This account may be created by simply sending the pertinent URL to the new ASP, which will return the new account page. The ASP then completes this page as the user himself would do. If the ASP requires additional information, it can query the end user as required. If the end user has already set up an account with the new ASP, this step may be unnecessary, and the ASP may simply log on to the existing account.

Once access is made to the new ASP, the routine may begin to upload the folder structure at step 450, and email data itself at step 455. Typically, these steps will constitute separate steps of creating a new folder structure and then inserting data into the desired folders, though they may be done in other manners that would be clear to one skilled in art.

Once it is confirmed at step 460 that all of the data and folder structure have been uploaded to new the ASP, the routine will advise of the progress to the end user at step 465. The routine may then wrap up the process at step 470 by logging off from the new ASP, informing the end user of completion of transfer, preparing billing records and preparing an audit file. The routine may also initiate a recurring timer to awake a software agent periodically to check the old ASP for emails to be forwarded to the new ASP.

Many other options and alternatives may be included, which would be clear to one skilled in the art; some of which are described herein.

Software Architecture

In the preferred embodiment, the invention is to be implemented as software residing on an ASP server 160. This software will preferably have a modular architecture with the following components:

1. Web Presence: This is the actual ASP web-site of the invention. This site is not normally accessed directly by the client, but rather is referred by a partner web-site. The ASP server 160 web-site of the invention will then portray the look and feel of the referring web site.
2. Database: User information may be stored and managed using any method known in the art. In the preferred embodiment, a relational database management system (RDBMS) is used, which is a program that allows you create, update, and administer a relational database such as Microsoft's Access, Oracle's Oracle7, or Computer Associates' CA-OpenIngres. The relational database will be used to store end user data on the ASP server 160. Other suitable database management systems include object-orientated database management systems (ODBMSs), though an appropriate means of storing data would depend on the application, and would be clear to one skilled in the art.
3. Queuing Engine: The queuing engine is a front-end application to the RDBMS. It takes business logic events and translates them into entries in the database schema. The Scheduling engine, Read/Writers and Persona Managers all interact with the Queuing engine rather than with the RDBMS directly. Items such as queue items, logging and billing information all pass through this service.
4. Scheduling Engine: The scheduling engine watches for items in the queue and matches them with the appropriate Reader/Writer based on the current load of the system, the priority of the request and the "best-match" of the reader/writer to the request. It may be considered a "dating service" for switch-requests.
5. Core Reader/Writer: Readers/Writers (RW) fetch client data from one service and move the data to other services. There are specific RWs for each service the client may use. The Core RW takes care of operations common to all RWs regardless of their specialty. This includes, but is not limited to Cookie management, talking with the services web server and SSL certificate negotiations.
6. Vertical R/Ws: To build on the Core RWs, there are also RWs that are specific to a particular vertical, for example: Email, Stock Portfolios, Banking, and ASPs. These Vertical RWs (VRWs) take the raw HTTP/web communications and translate them into industry specific business objects. Business entities such as accounts, portfolios and mailing lists all reside in the VRWs.
7. Specific VRW: At the most fine-grained level of the system are the Specific VRWs (SVRWs). The SVRWs are the exact implementations for dealing with a single web-based service. Services such as Yahoo™ Email, Yahoo Stock quotes, CIBC™ portfolio manager, Hotmail™ email would all require their own SVRWs.
8. Persona Manager: As the system of the invention extracts more and more information about a particular client, this information is accumulated in the Persona Manager. The service traits, level of support and feature utilization for example, of a particular user is stored in this system and is analysed with an inference engine.

Potential Sources of Revenue:

The invention may generate revenues in many ways, such as:
1. selling software to large ASPs and enterprises for a fixed fee, or on the basis of the number of transfers;
2. user switching transaction fees (from partners and resellers). Service providers will be charged a fixed dollar amount per customer switched;
3. selling aggregate market data on users' behaviours. Data mining will be done on transactions and this information will be sold at a fixed rate per user every time it is used; and
4. advertising revenues.

Potential Partners

Clearly, the invention could be applied to all markets: corporate, individual, wholesale and value-added. Several specific applications, and their particular considerations, include:

1. Wireless Service Providers

According to estimates, there will be more wireless devices than personal computers connected to the Internet 100 in the next three years, and analysts predict there will be more than 1 billion mobile phones in use by 2003. These figures have led observers to compare today's wireless Web industry to the early days of the Internet.

With emerging wireless devices and communications services that offer instant access to a user's e-mail, calendaring, and stock information, the number of cellular communication services providers (celcos) partnering with established Internet portals continues to rise. These partners are integrating services and offering customers one conveniently packaged bundle. For example, Bell Mobility™ is bundling Yahoo e-mail and calendaring services as well as time-sensitive personalized content such as stock quotes, sports scores, weather, and horoscopes to their wireless phone and mobile handheld device customers. Rogers/AT&T™ is partnering with Excite™ to offer wireless customers the Excite e-mail, calendaring, and stock portfolio bundle. Yahoo! users will have wireless access to Yahoo! Mail to view, originate, reply and delete email messages; Yahoo! Address Book with full search and retrieval functionality; and, Yahoo! Calendar with preferences accessible to add, edit or delete scheduled appointments.

The problem begins when a Bell Mobility customer wants to switch because Rogers/AT&T is offering wireless customers a better price, a new wireless service, or a breakthrough technology. The Bell Mobility customer has their entire life integrated into the Bell Mobility/Yahoo system. If they want to switch service providers, they will face a frustrating, time-consuming, and error-prone experience.

The wireless market, because of high turnover rate, rapid innovation, and fierce competition, offers tremendous opportunities for the invention.

2. Pureplay Internet Portals

To maintain a customer base, acquire new subscribers, and stay competitive, Internet portals continue to introduce discontinuous innovations and enhance functionality. "Stickiness" is a way of measuring the advertising potential of any given web site. The longer the customer stays at a particular website, the higher the potential for advertising revenue. Portals increase "stickiness" by offering better content and more value such as free search engine services, email services and calendaring services. To maintain their competitive edge, portals relentlessly create new content and features through aggressive R&D, acquisitions, and partnerships with other Internet technology companies.

Portals such as Yahoo, Excite, and AOL™ have an enormous subscriber base. Their customers could easily be displaced to other service providers by use of the invention, avoiding the current average cost of $108 (USD) to acquire each new customer.

3. Telecommunications and Communications Service Providers

To gain a competitive advantage over the competition, telcos (telephone companies) and celcos (cellular telephone companies) want to own the majority (or 100%) of their customers' online persona. Celcos and their associated devices enhance their customers' lives by relying on and leveraging information from the following sources: unified messaging mailbox, calendar, address book, folders, mailing lists, stock portfolios, sports information, weather information in addition to any other service-based personal information.

In the very near future, celcos will offer "super bundles" to customers. Since the customer's entire persona will be locked into their service, owning each individual persona will be essential, and it will be worth a significant amount to the service provider. The invention allows telco and celco providers to obtain personas from service provider sources/competitors.

4. Financial Service Providers

Banks and financial institutions have prospered due to the high switching costs associated with moving from one bank to another. Via the web, a bank customer can check account balances, pay bills, and review their transactions. E*Trade leads the online brokerage pack and plans to spend almost $100 million in its marketing campaign this year. Their cost to acquire each new customer is a little more than $400 (USD).

Internet users are taking control of their investments and the Internet is enabling them to do so effortlessly and conveniently. A high percentage of novice investors start by monitoring stocks on sites that allow them to build free stock portfolios and get real-time quotes. Owning customers at this level is worth a lot to service providers since they can generate revenues by advertising and up sell to their "customers". Online financial service providers are constantly adding new features and improving the quality of their service.

Opportunities to apply the invention abound in this highly competitive environment. Hence, future marketing efforts may target the online banking industry, conveniently switching customer accounts and holdings from one institution to another: from bricks and mortar banks such as Bank of America™ and Citibank™, to emerging e-banks such as Wingspan.com™ and E*Trade Bank™.

5. Application Service Providers

The ASP market is growing at an exponential rate. The market research firm Dataquest™ predicts that the ASP market will be worth nearly $23 billion by 2003. This will force more software vendors to offer web-only versions of their most popular software. With this growth it becomes increasingly important for customers to have the ability to switch from one service to another, taking all of their content-creation efforts with them.

Additional Options

The invention may be applied in many ways, as described above, and in other ways which would be clear to one skilled in the art. As well, the invention may be complemented in many ways including the following:

1. additional steps of returning feedback to the end user;
2. optional rollback, which is facilitated by storing the original downloaded data;
3. error detection steps, such as timing out while waiting for a response. These techniques are well known in the art;
4. use of a multi-threading architecture so that multiple requests for pages may be sent at the same time, decreasing the elapsed time required to download data. Each request would have to be tagged so that the responses may be properly collated when they are received;
5. sending page requests via various proxy servers to avoid possible denial from the ASP 110, 120 being relocated;
6. auto forwarding of new Emails from the old address to the new address after switching service providers;
7. encryption using SSL or similar security;
8. language localisation;
9. extend the invention to relocate multiple users, allowing, for example, a company to change the ASP for its entire staff with a single command;
10. include 'brandlining' of web-pages to make the invention appear to be 'owned by' the partnering organisation, although in fact it resides on the service switching ASP server 160. This technique improves "trust" between the end user and the ASP;
11. extracting data from multiple sources, combining like data in the service switching facility, and transferring the combined data to a single destination service. This technique helps combat bundling, common on portals and cellular telephones and appliances;
12. omitting steps for translating into a temporary meta data, instead doing 'on the fly' translation between source and destination formats; and
13. the addition of step(s) to record information directly pertaining to the habits of the end-user in order to provide a 'persona' profile of the user for business purposes.

In transferring from one ASP to another, the end-user hopes to have minimal involvement in the process, but to retain sufficient control and feedback to be reassured. They would like simply to decide to move a service from one ASP to another, provide the minimum of required information, have sufficient feedback to feel comfortable that the process is working and correct, have access to some form of audit trail, know that 'roll-back' is possible, and have the new system replicate the old content, format and file structure as closely as practicable. For the example given of transferring Email service, the end-user simply provides the location of the old Email account, as well as its userid and password. This is no harder than logging on to read their Email in normal situation, and there is little room for error; the consequence of giving an incorrect response is that the transfer does not even start.

Since the system is relatively fast in operation, the end-user can be kept informed of progress during the transaction. On completion of the transfer the end-user can be sent a summary of the activities carried out. Also, following the completion of the transfer, the system can periodically and automatically log in to the old Email account, check for any new Email, and send or transfer a copy to the new account. Once the volume of Email arriving at the old account falls below a certain threshold, the end-user can make a decision to close the old account.

The 'stickiness' factor means that the more data about, or belonging to, an end-user that resides on a particular ASP's server, the harder it is for that end-user to change allegiance and move to a competitor. With the evident financial value of new end-users to potential customers, a service that overcomes this 'stickiness' would clearly be highly valued.

Although the invention takes advantage of the standardisation of protocols and data inherent in the World Wide Web/Internet and HTML, and the current implementation presupposes networks, browsers and Applications which adhere to these standards, the invention may be equally applied to other environments where the protocols and interfaces are well understood, and consistent, even if proprietary.

While particular embodiments of the present invention have been shown and described, it is clear that changes and modifications may be made to such embodiments without departing from the true scope and spirit of the invention.

In the preferred embodiment described, the software is described as residing on an Internet server separate from either of the Email ASP servers. However, this software may reside at any location within the Internet including, but not limited to, the new Email ASP server, on the end-user's machine following download/transfer from an Internet Server, or transiently, for example as a Java Applet or in a distributed computing environment.

As well, the invention has been described with respect to the application of relocating user data from one ASP to another, but clearly could be applied to enterprise applications, where the user preferences or personal data for a large organization are moved as a group from an ASP to another ASP or even a private server (conversely, the data could be replicated from a private server to an ASP)

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such as computer diskettes, CD-Roms, Random Access Memory (RAM), Read Only Memory (ROM) or similar computer software storage media known in the art, may be programmed to execute such method steps.

The invention could, for example, be applied to computers, smart terminals, personal digital assistants, cellular telephones, set-top boxes and web TV, telephone over IP and Internet-ready telephones. Again, such implementations would be clear to one skilled in the art, and do not take away from the invention.

What is claimed is:

1. A method comprising:
    accessing, in response to a data transfer request, a first account at a first location via a first interface, wherein the first account is accessed by emulating a first authentication operation, and wherein the first account is associated with a first application;
    extracting data in a first format from the first account at the first location by emulating a first interaction operation;
    converting the extracted data into a second format; and
    transferring the converted data to a second account at a second location, wherein the second account is associated with a second application, and wherein the second application provides a similar service with respect to the first application.

2. The method of claim 1, wherein the extracted data comprises a folder structure.

3. The method of claim 1, further comprising emulating a second authentication operation to access the second account.

4. The method of claim 3, wherein emulating the second authentication operation comprises emulating the second authentication operation via a second interface associated with the second account.

5. The method of claim 3, wherein emulating the second authentication operation comprises entering at least one of an identifier or a password associated with the second account.

6. The method of claim 1, further comprising causing the transferred data to be saved at the second location using an import utility.

7. The method of claim 1, further comprising monitoring the first location for additional data associated with the first account.

8. The method of claim 7, further comprising:
    accessing, in response to an identification of the additional data, the first account via the first interface by emulating the first authentication operation;
    extracting the additional data in the first format from the first account by emulating a second interaction operation;
    converting the extracted additional data into the second format; and
    transferring the converted additional data to the second account at the second location.

9. The method of claim 7, wherein the monitoring for the additional data occurs after transferring the converted data to the second account.

10. An article of manufacture including a computer-readable medium having non-transitory instructions stored thereon, that if executed by a computing device, cause the computing device to perform operations comprising:
    accessing in response to a data transfer request, a first account at a first location via an interface, wherein accessing the first account includes emulating a first authentication operation, and wherein the first account is associated with a first application;
    extracting data in a first format from the first account by emulating an interaction operation, wherein the extracted data comprises user account data and user account organizational structure;
    converting the extracted data into a second format; and
    transferring the converted data to a second account at a second location, wherein the second account is associated with a second application, and wherein the second application provides a similar service with respect to the first application.

11. The article of manufacture of claim 10, wherein the computing device further performs operations comprising accessing the first account via a graphic user interface.

12. The article of manufacture of claim 10, wherein the computing device further performs operations comprising accessing the second account by emulating a second authentication operation.

13. The article of manufacture of claim 12, wherein the operations that cause the computing device to access the second account by emulating the second authentication operation include operations that facilitate entering a password associated with the second account.

14. The article of manufacture of claim 10, wherein the computing device further performs operations comprising saving the extracted data.

15. The article of manufacture of claim 10, wherein the computing device further performs operations comprising monitoring the first location for additional data associated with the first account, wherein the monitoring occurs subsequent to the transfer of the converted data to the second account.

16. The article of manufacture of claim 10, wherein the operations that cause the computing device to emulate the first authentication operation include operations that facilitate entering a password associated with the first account into the interface.

17. A computing device comprising:
a processor; and
a memory operatively coupled to the processor and storing computer-readable instructions that, in response to execution by the computing device, cause the computing device to:
emulate, in response to a data transfer request, a first authentication operation to access a first account at a first location via an interface, wherein the first account is associated with a first application;
emulate an interaction operation to extract data in a first format from the first account, wherein the extracted data comprises user account data and user account organizational structure;
convert the extracted data into a second format; and
transfer the converted data to a second account at a second location, wherein the second account is associated with a second application, and wherein the second application provides a similar service with respect to the first application.

18. The computing device of claim 17, wherein the first account comprises a first e-mail account and the second account comprises a second e-mail account.

19. The computing device of claim 17, wherein the computer-readable instructions further cause the computing device to access the second account by emulating a second authentication operation.

20. The computing device of claim 19, wherein emulating the second authentication operation comprises receiving an identification and a password associated with the second account.

21. The computing device of claim 17, wherein the computer-readable instructions further cause the computing device to request the transferred data be saved at the second location.

22. The computing device of claim 17, further comprising a server, wherein the data transfer request is received from a web site in communication with the server.

23. The computing device of claim 17, wherein the computer-readable instructions further cause the computing device to derive source data from the extracted data, wherein the source data is transferred to the second account.

24. The computing device of claim 23, wherein the source data is derived using a delta technique.

* * * * *

UNITED STATES PATENT AND TRADEMARK OFFICE
CERTIFICATE OF CORRECTION

PATENT NO. : 7,877,516 B2
APPLICATION NO. : 11/468878
DATED : January 25, 2011
INVENTOR(S) : Giroux et al.

Page 1 of 1

It is certified that error appears in the above-identified patent and that said Letters Patent is hereby corrected as shown below:

Title page, item (76), under "Inventors", in Column 1, Line 4, delete "BON 2F0" and insert -- BON 2P0 --.

Title page, below item 60, in Column 1, insert
-- (30) Foreign Application Priority Data
Apr. 12, 2000 (CA)..............2,305,112 --.

Title page, item (56), under "Other Publications", in Column 2, Line 3, delete "wwvv" and insert -- www --.

Column 1, line 14, delete "On" and insert -- on --.

Column 14, line 30, in Claim 22, delete "web site" and insert -- website --.

Signed and Sealed this
Third Day of May, 2011

David J. Kappos
*Director of the United States Patent and Trademark Office*